United States Patent [19]

Newman

[11] 4,195,741

[45] Apr. 1, 1980

[54] TRUCK MOUNTED RAILROAD CRANE HYDRAULIC SWIVEL MEANS

[76] Inventor: Timothy L. Newman, 700 N. Liberty, Jerseyville, Ill. 62050

[21] Appl. No.: 911,638

[22] Filed: Jun. 1, 1978

[51] Int. Cl.[2] ........................ B66C 23/84; F16L 39/02

[52] U.S. Cl. ........................................ 212/66; 285/136

[58] Field of Search .................................... 212/30-35, 212/66; 285/134, 136

[56] References Cited

U.S. PATENT DOCUMENTS

| | | | |
|---|---|---|---|
| 3,477,746 | 11/1969 | Watson | 285/136 X |
| 3,743,223 | 7/1973 | Spellman | 212/66 X |

*Primary Examiner*—Robert G. Sheridan

*Attorney, Agent, or Firm*—Michael Kovac

[57] ABSTRACT

A hydraulic swivel assembly for crane boom means in a truck mounted railroad crane or the like is disclosed as including complementary fixed and rotating housing elements having fluid passageways capable of communicating with other fluid passageways for controlling crane boom means and turntable rotation, regardless of position.

6 Claims, 7 Drawing Figures

TRUCK MOUNTED RAILROAD CRANE HYDRAULIC SWIVEL MEANS

SUMMARY OF THE INVENTION

This application is related to my following copending patent applications: Ser. No. 911,597 filed June 1, 1978 entitled "TRUCK MOUNTED RAILROAD CRANE MAIN BED FRAME"; Ser. No. 911,637 filed June 1, 1978 entitled "TRUCK MOUNTED RAILROAD CRANE RAIL GEAR ASSEMBLY"; and Ser. No. 911,627 filed June 1, 1978 entitled "TRUCK MOUNTED RAILROAD CRANE BOOM SECTION".

The present invention is in the field of truck mounted railroad cranes which are convertible highway/railway vehicles capable of highway travel on a truck chassis, as well as being convertible for travel on train rails through extensible front and rear train railgear, which guide the vehicle on train tracks, while allowing the rubber wheels of the vehicle to move the vehicle to the desired location.

Such vehicles are principally used for train derailments, although they are useful for other train and rail construction and maintenance operations.

At the site of a train derailment, the truck mounted railroad crane, which has previously been driven as a truck over highways and then positioned on or adjacent tracks leading to the train derailment, is ready to re-position de-railed train cars back onto tracks from which they have become de-railed. This is achieved through the swiveling crane boom also mounted on the truck chassis. The operator of the truck mounted railroad crane positions himself in the crane cab to operate the crane controls that raise, lower and swing the crane boom for re-positioning the de-railed railcar back on train rails.

Truck mounted railroad cranes are thus versatile pieces of equipment that require both highway and railway travel, as well as operation and control of crane booms. As will also be appreciated, such vehicles must withstand vigorous conditions encountered in transporting same and in operating the crane.

When the operator positions himself to operate the crane controls that raise, lower and swing the crane boom, it is necessary that the crane controls permit raising or lowering of the crane boom to various levels as it is rotated or swiveled. Generally, hydraulic controls are used since it has been found hydraulically operated crane booms are positive and quick acting for the heavy loads and stresses encountered; however, the hydraulic fluid lines tend to wrap around the swivel housing of the crane cab or otherwise interfere and become entangled with one another. At the same time the swivel housing must provide a fluid communication therethrough without leaking, while maintaining a strong and rigid structural support for the crane cab.

Accordingly, it is an object of the present invention to provide a new and improved swivel means for a truck mounted railroad crane.

More specifically, it is an object of the present invention to provide a swivel means incorporating fluid controls which interconnect between the crane controls and the crane boom, without the need for fluid hose lines or the like.

These and other objects and advantages will become apparent from the ensuing description.

DESCRIPTION OF THE PREFERRED EMBODIMENTS

Figure 1:
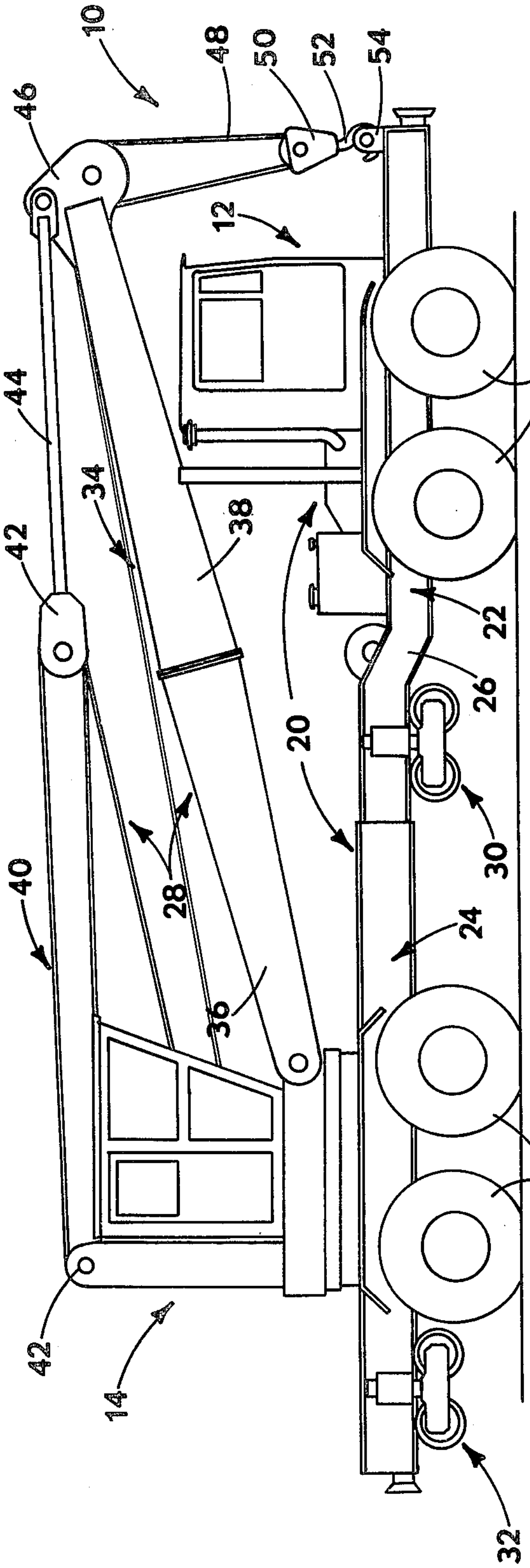
FIG. 1 is a side elevational view of a truck mounted railroad crane, including swivel means, which is constructed in accordance with the teachings of the present invention.
Figure 2:
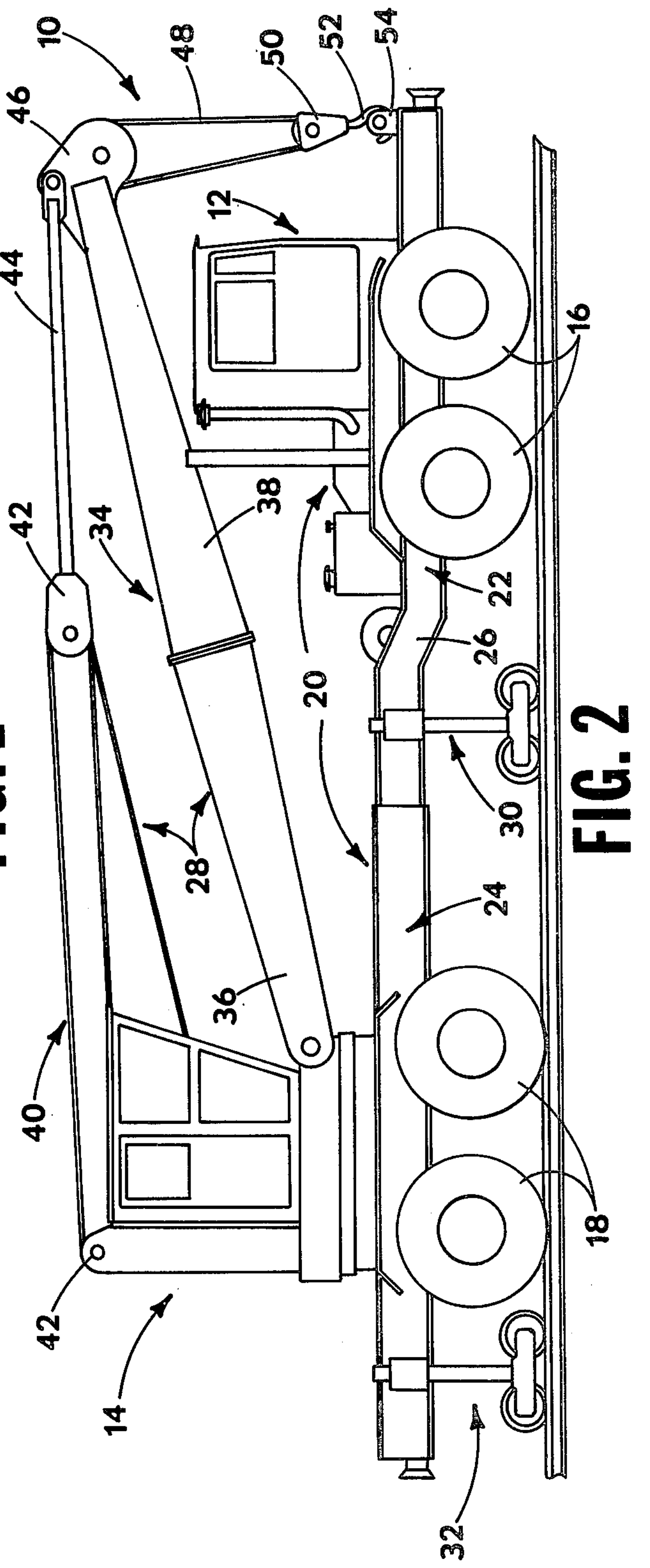
FIG. 2 is a side elevational view, similar to FIG. 1, but showing the truck mounted railroad crane convertible for travel on train rails.

FIGS. 1 and 2 of the drawings show my preferred design of truck mounted railroad crane 10 which includes a truck cab 12 at the front end and a crane cab 14 at the rear end. The truck cab 12 is mounted over the front pneumatic rubber tires 16 while the crane cab 14 is mounted over the rear pneumatic rubber tires 18. The truck cab 12 and crane cab 14 are interconnected through the vehicle frame 20 that includes a truck chassis frame 22 and crane bed frame 24. It will be seen that the truck chassis frame 22 is mounted lower than crane bed frame 24 through the angular interconnecting frame structure 26. There are several reasons for this including maintaining the crane boom superstructure 28 at the lowest possible height when traveling over highways, as shown in FIG. 1, while enabling the truck cab 12, frame 22 and tires 16 to be lifted off the railroad tracks, as shown in FIG. 2, to allow transporting of the truck mounted railroad crane 10 to the desired location over railroad tracks.

This lifting of the truck cab 12, frame 22 and tires 16 at the front end of the truck mounted railroad crane 10 is achieved by the front and rear train gear 30, 32 that are mounted on the crane bed frame. As seen in FIG. 1, the front and rear train rail gear 30, 32 respectively are maintained in a retracted position to allow the front and rear pneumatic rubber tires 16, 18 respectively to move the truck mounted railroad crane 10 over highways. However, when the desired train rail location has been reached, the truck mounted railroad crane 10 is driven into a straddle position over train rails, and the front and rear train rail gears 30, 32 respectively are lowered or extended to raise the truck cab 12, truck chassis frame 22 and front pneumatic rubber tires 16 off of the railroad tracks. This enables the front and rear train rail gears 30, 32 respectively to guide the truck mounted railroad crane 10 over train rails, while allowing inside pairs of wheels (not shown) of the rear pneumatic rubber tires 18 to rest upon and engage the train rails. In this way, the truck mounted railroad crane 12 is transported over train rails by the driven rear pneumatic rubber tires 18 of the truck mounted railroad crane 10.

When the truck mounted railroad crane 10 reaches the desired location, such as a train derailment, train rail construction, train rail maintenance operation or the like, the crane boom superstructure 28 may then be put into operation to raise, lower and swing train cars and the like, as may be desired. The crane boom superstructure 28 includes a boom 34 that is hingedly mounted to the crane cab 14 for raising and lowering of the boom 34, as well as for swiveling or rotational movement of the crane cab 14 and associated boom 34 relative to the crane bed frame 24. The boom 34 comprises two sections, an inboard section 36 and an outboard section 38. The inboard section 36 is pivotally or hingedly attached to the crane cab 14 while the outboard section 38 is supported and its angular position controlled by means of the hoisting cables 14 reeved through suitable hoisting cable sheeves 42 and the connecting link 44 that extends between the outermost sheeve 42 and the fixed block sheeve 46 mounted at the free end of the outboard section 38. The fixed block sheeve 46 threadably carries a lift cable 48 which is also threaded over a load engaging block 50 that includes a hook 52. When not in use, the hook 52 is restrained by the shaft block 54 mounted at the front of the truck chassis frame 22, as seen in FIGS. 1 and 2.

With the above general description of components of the truck mounted railroad crane 10, attention is now directed to the swivel assembly 60 for the crane boom superstructure 28 which is shown in FIGS. 3–7 of the drawings.

Figure 3:
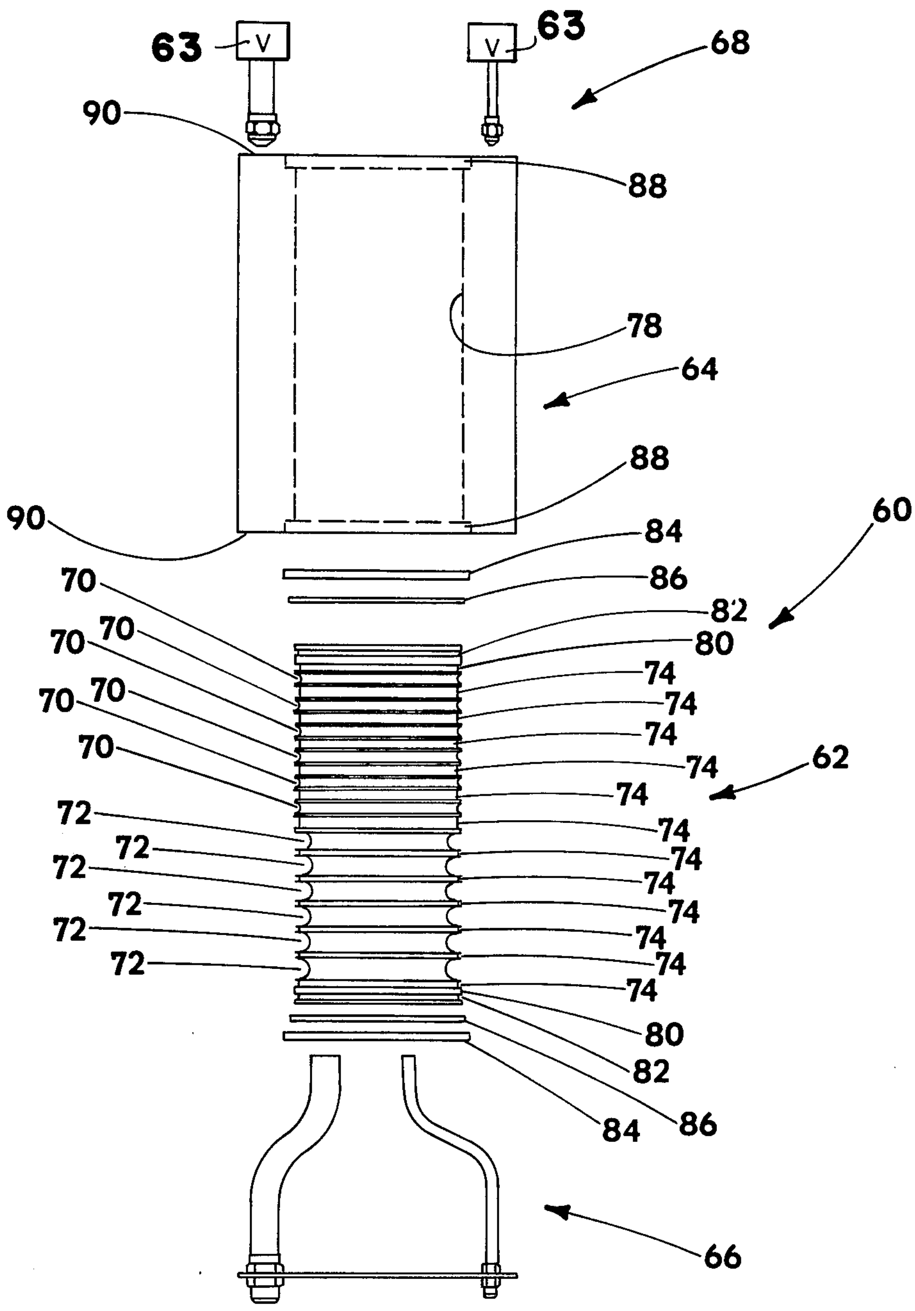
FIG. 3 is an exploded side elevational view of the principal components of the swivel means.

FIG. 3 of the drawings is an exploded view of the swivel assembly 60 which includes a first elongated housing element 62 which is fixedly mounted to the vehicle frame 20 and a second elongated housing element 64 rotatably mounted on the first elongated housing element 62. The first elongated housing element 62 is fixedly mounted to the vehicle frame 20 by being mounted on the lower manifold means 66 which is, in turn, mounted on the vehicle frame 20. The second rotatably mounted housing element 64 carries with it the upper manifold means 68, in the form of individual lines, which are mounted to the upper end of the second rotatably mounted housing element 64 for rotation therewith.

The crane cab 14 is mounted, through the first fixedly mounted elongated housing 62 and the second rotatably mounted elongated housing 64 of the swivel assembly 60, to the vehicle frame 20 for rotation or swivel movement therewith. Within the crane cab 14 are crane boom control means 63 which are in the form of hydraulic valves for opening and closing fluid flow through the swivel assembly 60 for controlling operation of the crane boom superstructure 28, including raising, lowering and swinging the boom 34 to desired positions. While not specifically illustrated, it will be appreciated that a hydraulic circuit for connecting the crane boom control means to the crane boom superstructure 28 through a fluid source or sump is necessary in order to establish the fluid pressure requirements for operating the crane boom superstructure 28. Since the hydraulic valves and circuits are well known in the art, a specific description thereof is not necessary in order to understand the present invention.

As has been discussed above, it is important that the swivel housing not only provide a strong and rigid structural support for the crane cab 14, but must also provide fluid communication therethrough, so as to prevent the interference or entanglement of hydraulic fluid lines with the rotating or swiveling crane cab 14.

In accordance with the present invention, this is achieved by providing fluid communication passageways in the first fixedly mounted elongated housing 62 and the second rotatably mounted elongated housing 64, regardless of rotation or swiveling of the crane cab 14. More specifically, it will be seen that the first fixedly mounted elongated housing 62 is provided with a plurality of adjacently positioned upper circumferential grooves 70 of smaller predetermined width than a plurality of adjacently positioned lower circumferential grooves 72. The smaller upper grooves 70 are arranged to carry fluid from the crane valve controls through the larger lower grooves 72 that are operatively connected by a hydraulic circuit through a fluid source to the crane boom superstructure, as will become apparent.

Figure 7:
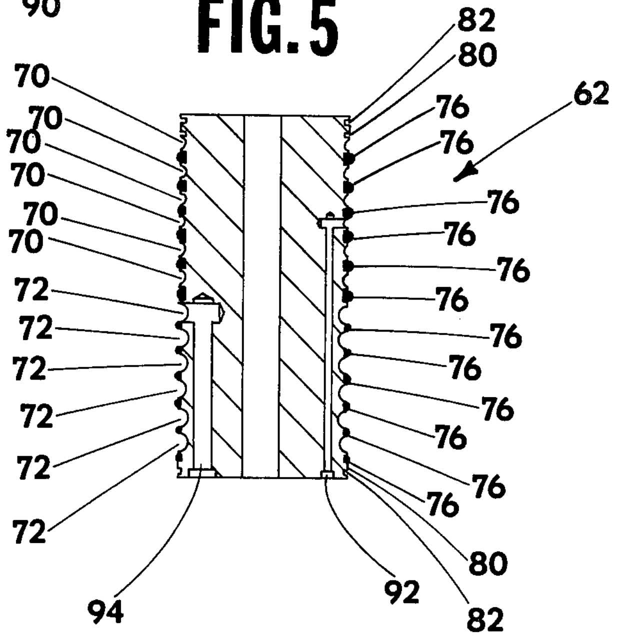
FIG. 7 is a sectional view of the fixed element of the swivel means as viewed along line 7—7 of FIG. 6.

In order to seal each upper and lower groove 70, 72 respectively from each other, the first fixedly mounted elongated housing means is further provided with O-ring grooves 74 between each adjacent upper and lower groove 70, 72 for receiving an O-ring sealing means 76 as shown in FIG. 7. When the first fixedly mounted elongated housing 62 is positioned within the central opening 78 of the second rotatably mounted elongated housing 64, the O-ring sealing means 76 are trapped and compressed in sealing position by the inner wall surface surrounding the central opening 78.

Opposite ends of the first fixedly mounted elongated housing 62 are provided with bushing and retaining ring grooves 80, 82 respectively for receiving the bushing element 84 and retaining ring 86 that rotatably mount the first fixedly mounted elongated housing 62 and second rotatably mounted elongated housing 64 to each other, while holding the housings 62, 64 in telescoped position relative to one another. The second rotatably mounted elongated housing 64 includes enlarged openings 88 at each end of the central opening 78, for receiving the bushing elements 84, while the retaining rings 86 engage the outside upper and lower faces 90 of the second rotatably mounted elongated housing 64 to maintain the housings 62, 64 in telescopically assembled relationship to one another.

Figure 6:
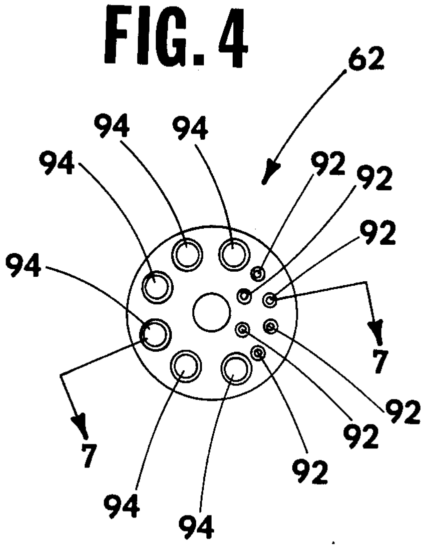
FIG. 6 is a top plan view of the fixed to main frame element of the swivel means shown in FIG. 6.

In order to provide fluid communication between an upper groove 70 and a lower groove 72 there is provided in the first fixedly mounted housing 62 an individual longitudinal passageway 92 for each upper groove 70 and an individual longitudinal passageway 94 for each lower groove 72. This is best seen in FIGS. 6–7 of the drawings where six longitudinal passageways 92 are provided for the six upper grooves 70 as well as six longitudinal passageways 94 for the six lower grooves 72. Thus, control valves (not shown) connected through the control channels (upper grooves 70 and longitudinal passageways 92) can be selectively connected to the boom control channels (lower grooves 72 and longitudinal passageways 94).

Figure 4:
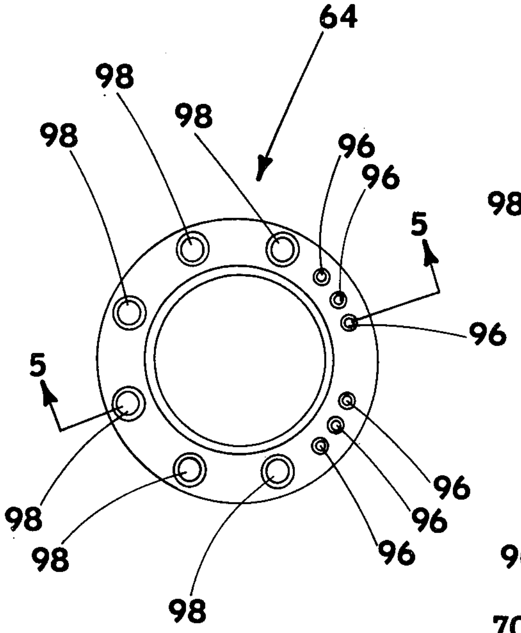
FIG. 4 is a top plan view of the rotating with hoist deck element of the swivel means shown in FIG. 4.
Figure 5:
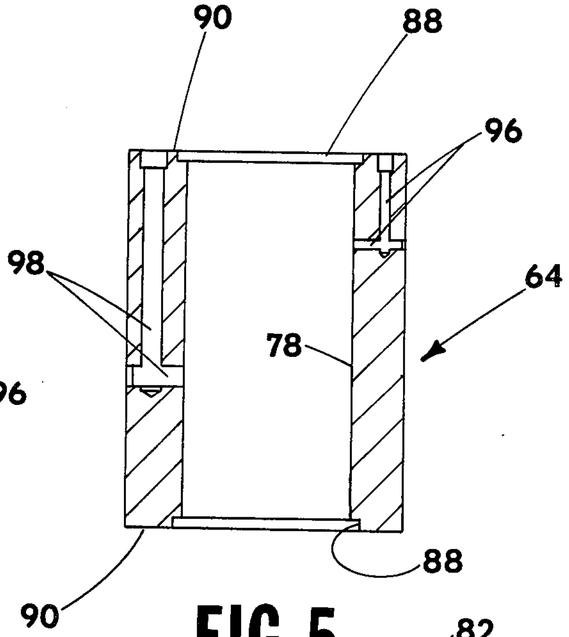
FIG. 5 is a sectional view of the rotating element of the swivel means as viewed along line 5—5 of FIG. 4.

For corresponding communication therewith regardless of position of the second rotatably mounted elongated housing 64, there is provided in the second rotatably mounted elongated housing 64, longitudinal and laterally extending passageways 96, which are arranged to communicate with the upper grooves 70 and longitudinal passageways 92, the longitudinal and laterally extending passageways 98, which are arranged to communicate with the lower grooves 72 and the longitudinal passageways 94. This is best seen in FIGS. 4–5 of the drawings where there is shown six longitudinal and laterally extending passageways 96 for communication with the upper grooves 70 and six longitudinal and laterally extending passageways 98 for communication with the lower grooves 72.

When the first fixedly mounted elongated housing 62 is telescopically assembled within the second rotatably mounted elongated housing 64, it is then possible to achieve selective fluid control from the control valves 63 in the crane cab 14 to any selective one of the six valve control channels (longitudinal and laterally extending passageways 96) in the second rotatably mounted housing 64, from thence through any selective one of the six upper grooves 70 and longitudinal passageways 92 in the first fixedly mounted housing 62, then through the lines in the lower manifold means 66 from thence through any selective one of the six longitudinal passageways 94 and lower grooves 72, and then through any selective one of the six longitudinal and laterally extending passageways 98 in the second rotatably mounted housing element 64 for complete hydraulic circuit communication through the lines of the upper manifold means 68, which are, in turn, connected to the control valves 63 in the crane cab 14 for operating the crane boom superstructure 28.

Regardless of relative rotational position of second rotatably mounted elongated housing element 64 relative the first fixedly mounted elongated housing element 62, fluid communication is established for operating the crane boom superstructure 28 without fluid line interference or entanglement. Further, it will be seen that the upper and lower circumferential grooves 70, 72 are formed in the outer circumferential surface of the first fixedly mounted elongated housing 62, while the longitudinal passageways 92, 94 in the first fixedly mounted elongated housing 62 and the longitudinal and laterally extending passageways 96, 98 in the second rotatably mounted elongated housing 64 are circumferentially spaced around the housings 62, 64 as shown in FIGS. 4 and 6. Thus, the first fixedly mounted elongated housing 62 and second rotatably mounted elongated housing 64 provide a strong and rigid load bearing structure, while providing fluid communication therethrough.

From the foregoing, it will be appreciated that the swivel assembly for crane boom means in a railroad vehicle or the like provides fluid intercommunication between fixed and rotating housing elements, without loss of sufficient load bearing rigidity and support.

I claim:

1. A swivel assembly for crane boom means in a railroad vehicle or the like, including a vehicle frame, a first elongated housing element fixedly mounted to said vehicle frame and a second elongated housing element rotatably mounted on said first elongated housing element, said crane boom means being capable of being mounted to said second elongated rotatably mounted housing element, said first fixedly mounted elongated housing element including a plurality of adjacently positioned upper circumferential groove means and a plurality of adjacently positioned lower circumferential groove means, each of said groove means being connected to an individual longitudinal passageway provided in said first fixedly mounted elongated housing means which extends from and connects one of each of said upper and lower circumferential groove means through the lower end of the first fixedly mounted elongated housing element, said second elongated rotatably mounted housing element also being provided with individual longitudinal passageway which extend from the respective level of each upper and lower circumferential groove means in said first fixedly mounted elongated housing means through the upper end of the second elongated rotatably mounted housing element, sealing means for sealing each upper and lower circumferential groove means in said first fixedly mounted elongated housing element, manifold means connecting the upper end of said second rotatably mounted housing element and the lower end of the said first fixedly mounted housing element with a fluid source, control means for opening and closing fluid flow to the upper circumferential groove means for directing fluid into selective lower circumferential groove means of said first fixedly mounted elongated housing element and crane boom means operatively connected to said lower circumferential groove means of said first fixedly mounted elongated housing element for operating respective crane boom components.

2. The swivel assembly as defined in claim 1 wherein said sealing means comprises O-ring elements positioned between each adjacent upper and lower circumferential groove means in said first fixedly mounted elongated housing element, said O-ring elements being compressed and trapped in sealed position by the inner wall surface of said second rotatably mounted housing element.

3. The swivel assembly as defined in claim 1 wherein said manifold means connected to the lower end of said first fixedly mounted elongated housing element is fixed to said vehicle frame.

4. The swivel assembly as defined in claim 3 wherein said manifold means connected to the upper end of said second rotatably mounted housing element is fixed to and rotates with said second rotatably mounted housing element.

5. The swivel assembly as defined in claim 1 wherein the grooves are circumferential spaced from each other and the longitudinal passageways are circumferentedly spaced from each other.

6. The swivel assembly as defined in claim 5 wherein the respective grooves and longitudinal passageways are equally spaced from corresponding grooves and passageways of the said dimension.

* * * * *